United States Patent
Li et al.

(10) Patent No.: US 11,057,202 B2
(45) Date of Patent: Jul. 6, 2021

(54) PULSED LIGHT HIGH-SPEED POLARIZATION LOCKING METHOD OF CONTINUOUS-VARIABLE QUANTUM KEY DISTRIBUTION SYSTEM

(71) Applicant: Shanxi University, Taiyuan (CN)

(72) Inventors: Yongmin Li, Taiyuan (CN); Wenyuan Liu, Taiyuan (CN); Xuyang Wang, Taiyuan (CN)

(73) Assignee: SHANXI UNIVERSITY, Taiyuan (CN)

( * ) Notice: Subject to any disclaimer, the term of this patent is extended or adjusted under 35 U.S.C. 154(b) by 109 days.

(21) Appl. No.: 16/692,254

(22) Filed: Nov. 22, 2019

(65) Prior Publication Data

US 2020/0169397 A1    May 28, 2020

(30) Foreign Application Priority Data

Nov. 23, 2018 (CN) .......................... 201811406184.6

(51) Int. Cl.
| | |
|---|---|
| *H04B 10/524* | (2013.01) |
| *H04J 14/06* | (2006.01) |
| *H04J 14/08* | (2006.01) |
| *H04B 10/70* | (2013.01) |
| *H04L 9/08* | (2006.01) |

(52) U.S. Cl.
CPC ......... *H04L 9/0858* (2013.01); *H04B 10/524* (2013.01); *H04B 10/70* (2013.01); *H04J 14/06* (2013.01); *H04J 14/08* (2013.01)

(58) Field of Classification Search
CPC .................................. H04J 14/06; H04J 14/08
See application file for complete search history.

(56) References Cited

U.S. PATENT DOCUMENTS

| | | | |
|---|---|---|---|
| 10,887,093 B2 * | 1/2021 | Li ..................... | H04L 9/0852 |
| 2004/0109564 A1 * | 6/2004 | Cerf ................... | H04L 9/0858 |
| | | | 380/256 |
| 2018/0294961 A1 * | 10/2018 | Wang .................. | H04L 9/0852 |
| 2019/0199523 A1 * | 6/2019 | Alleaume ........... | H04L 9/0852 |

OTHER PUBLICATIONS

Huang et al., Long-distance continuous-variable quantum key distribution by controlling excess noise, 2016, Scientific Reports (Year: 2016).*

* cited by examiner

*Primary Examiner* — Jai M Lee
(74) *Attorney, Agent, or Firm* — Tutunjian & Bitetto, P.C.

(57) ABSTRACT

A pulsed light high-speed polarization locking method of a continuous variable quantum key distribution system is disclosed. An integral type optical detector is used for converting energy of a single pulsed light into a peak voltage of an output electric pulse in real time so as to achieve real-time measurement of light pulse energy without conducting high-speed data sampling and simplify the data acquisition and processing. By utilizing the FPGA hardware, a conditional simulated annealing algorithm is quickly operated to search the target polarization state and achieve high-speed polarization locking under the pulsed light. In addition, the power change of a local oscillator is monitored in real time to strengthen the resistance of the system against local oscillator dithering attack. The present invention can effectively solve a problem of rapid fluctuations of polarization state of pulsed light caused by complex external environments.

7 Claims, 5 Drawing Sheets

PULSED LIGHT HIGH-SPEED POLARIZATION LOCKING METHOD OF CONTINUOUS-VARIABLE QUANTUM KEY DISTRIBUTION SYSTEM

TECHNICAL FIELD

The present invention relates to the field of quantum privacy communications, and specifically, to a pulsed light high-speed polarization locking method of a continuous-variable quantum key distribution (CV-QKD) system.

BACKGROUND

Quantum key distribution can achieve unconditionally secure key distribution, and its security depends on the Principles of Quantum Mechanics rather than some difficult mathematic problems. In combination with one-time pad, the quantum key distribution can ensure that legal parties achieve unconditionally secure communication, so as to have very wide application prospect in the fields of national defense, finance, military, network and the like.

Continuous-variable quantum key distribution (CV-QKD) protocols have the following advantages: its coherent state light source is easy to prepare; high detection efficiency and low-cost balanced homodyne detectors can be used; good compatibility with the existing optical communication networks; and the secure key rate in middle and short transmission ranges is high, so as to attract extensive attention of domestic and foreign researchers recently.

A CV-QKD protocol with Gaussian-modulated coherent states is regarded as a currently widely applied CV-QKD protocol. In this protocol, a transmitting end transmits a signal light and a local oscillator to a receiving end through the same long-distance single-mode fiber by utilizing a multiplexing technology. The receiving end conducts polarization demultiplexing on the signal light and the local oscillator, and the balanced homodyne detector is used for randomly detecting one of a pair of conjugate quadrature components of the signal light field. When a light field is transmitted through a long-distance single-mode fiber under a complex external environment such as an overhead fiber, buried fiber and the like, the birefringent effect of the single-mode fiber due to the environment temperature, stress and weather change induces the polarization state fluctuation of the light. This will result in the mutual crosstalk between the local oscillator and signal light, seriously influencing the relative phase locking between them, and the balanced homodyne detection results at the receiving end, which makes the QKD system not operate normally. The fluctuation velocity of the polarization state of the light field is closely related to the external environment. Implementation of real-time compensation of the polarization state fluctuation under the complex environment is one key technology to move continuous variable quantum key distribution system out of the CV-QKD laboratory and into the actual applications.

An existing polarization locking technology in CV-QKD system (as shown in Chinese Patent Application No. CN102916807A) utilizes an effective-value converter to integrate multiple acquired pulsed light signal into slowly changed DC voltage, which is used as the feedback signal of the polarization control algorithm to sequentially adjust voltages of the four squeezers of a dynamic polarization controller until the acquisition DC voltage meets a preset value, so as to accomplish the polarization locking. During the above polarization locking procedure, the DC voltage is obtained by integrating multiple pulsed light signals, and the voltages of the squeezers are sequentially adjusted in the algorithm, thereby causing that the whole polarization locking cycle is relatively long and the polarization state of the light field cannot be tracked and locked in real time. Additionally, quantum key distribution can only be paused during the period of the polarization locking. However, real-time, high-speed locking of the polarization state is the premise of ensuring high-efficient and secure quantum key distribution under an actual scene.

SUMMARY

An objective of the present invention is to provide a pulsed light high-speed polarization locking method of a continuous-variable quantum key distribution (CV-QKD) system to avoid the defects of the prior art.

The objective of the present invention can be achieved by utilizing the following technical solutions: a pulsed light high-speed polarization locking method of a CV-QKD system is designed, and the method includes: modulating a continuous light source to generate a pulsed light, splitting the pulsed light into a local oscillator and a signal light through a beam splitter, transmitting the local oscillator and the signal light in a same fiber by time division multiplexing and polarization multiplexing manners at a transmitting end of a CV-QKD system, and reaching a receiving end after the local oscillator and the signal light are transmitted through a long-distance single-mode fiber;

splitting a portion of the transmitted light, which is used for recovering a synchronous clock signal of the CV-QKD system, at the receiving end by utilizing the beam splitter;

conducting polarization demultiplexing of the local oscillator and the signal light on the rest portion of the light field through a dynamic polarization controller and a polarization beam splitter, splitting the local oscillator by utilizing a beam splitter to obtain a portion of the local oscillator as a first feedback signal of high-speed polarization locking;

detecting and converting the first feedback signal into a peak voltage of an output electric pulse through an integral type optical signal detector, and by utilizing the system synchronous clock as a trigger signal, monitoring the intensity change of the pulsed light in real time by acquiring the peak voltages of the electric pulse; and simultaneously utilizing the acquired peak voltage as a second feedback signal, utilizing the second feedback signal to conduct a conditional simulated annealing algorithm to search a target polarization state, obtaining a polarization locking signal, and then loading the polarization locking signal into a dynamic polarization controller so as to achieve high-speed locking of pulsed light polarization.

Where the step of utilizing the second feedback signal to realize the conditional simulated annealing algorithm specifically includes:

setting an inner cycle number and an outer cycle number in a simulated annealing algorithm to be 1 and k, and an initial temperature to be $T_0$; setting an inner cycle initial value i=1 and an outer cycle initial value n=1; defining a temperature updating function to be an exponential decreasing function: $T_{k+1}=p \cdot T_k$ (0<p<1);

loading the initial voltage values ($V_1$, $V_2$, $V_3$, $V_4$) to the squeezers of dynamic polarization controller, acquiring a pulse peak $V_i$ of the local oscillator as a second feedback signal, conducting a step voltage function to obtain a group of new voltage values ($V_1'$, $V_2'$, $V_3'$, $V_4'$) and a third feedback signal $V_f$, and meanwhile, calculating a current polarization extinction ratio;

comparing increment of the second feedback signals after calculating, $\Delta=V_t-V_i$; if $\Delta<0$, accepting the group of the voltage values $(V_1', V_2', V_3', V_4')$ as a current solution, and if $\Delta>0$, calculating a probability $$P = \exp\left(-\frac{V_t - V_i}{T_i}\right),$$

where $T_i$ is a current annealing temperature, and setting a to be a random number from 0 to 1; if P≥a, accepting the group of the new voltage values as the current solution; otherwise, continuing to utilize the original group of the voltage values as the current solution to conduct the next iteration;

updating the inner cycle number $i=i+1$; if $i<l$, returning to conduct a former step; and if $i>l$, updating the outer cycle number $n=n+1$, and meanwhile, updating the current annealing temperature $T_{k+1}=p \cdot T_k$; and monitoring the current polarization extinction ratio in real time; if a preset polarization extinction ratio threshold is met, stopping operating the algorithm and completing the polarization locking, where the current solution is the optimal solution; and if the preset polarization extinction ratio threshold is not met, and when $n>k$, completing the cyclic iteration, and outputting the current solution as the optimal solution.

Where in the step of modulating a continuous light source to generate a pulsed light and splitting the pulsed light into a local oscillator and a signal light through a beam splitter, the continuous light source is modulated to be a pulsed light with a repetition rate of 500 kHz, a pulse width of 100 ns and an extinction ratio of 80 dB through two cascaded amplitude modulators. The pulsed light is split into a local oscillator and a signal light through a 99/1 beam splitter.

Where the preset polarization extinction ratio threshold is 25 dB.

Where an integral type optical signal detection module converts energy of a single pulsed light into the peak voltage of the output electric pulse based on the principle of a charge amplifier.

Where the synchronous clock signal of the CV-QKD system is obtained as a clock signal having time delay and is used for triggering the FPGA hardware to control high-speed A/D to accurately acquire the peak voltage, the voltage is utilized as a feedback signal of a polarization locking algorithm in one aspect, and is also used for monitoring instantaneous change of pulsed light intensity to strengthen the resistance against the local oscillator dithering attack.

Where the conditional stimulated annealing algorithm utilizes sectional step-size step voltage functions; at an initial stage of the polarization control, the feedback signal is far from the optimal solution, and a large-step-length step voltage function is utilized; when the feedback signal reaches a certain value, a small-step-length step voltage function is utilized; and the value of the step length is set according to the real-time polarization extinction ratio to achieve an optimal locking effect.

Different from the prior art, the present invention provides the pulsed light high-speed polarization locking method of a CV-QKD system, the integral type optical signal detector based on the charge amplifier is used for converting energy of a single pulsed light into the peak voltage of the output electric pulse in real time, so as to achieve real-time energy measurement of a single pulsed signal light without requiring high-speed data acquisition and subsequent integration, effectively simplify the data acquisition and processing; by utilizing the characteristics of high data processing speed and good real-time performance of the FPGA hardware, the conditional simulated annealing algorithm is quickly operated to search the target polarization state and achieve high-speed polarization locking under the pulsed light; and the power change of the local oscillator is monitored in real-time to strengthen the resistance of the system to the local oscillator light dithering attack. The present invention can effectively solve the problem of rapid fluctuations of the polarization states of pulsed light caused by the complex external environments.

DETAILED DESCRIPTION

Technical solutions of the present invention will be further described in detail with reference to the specific embodiments. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
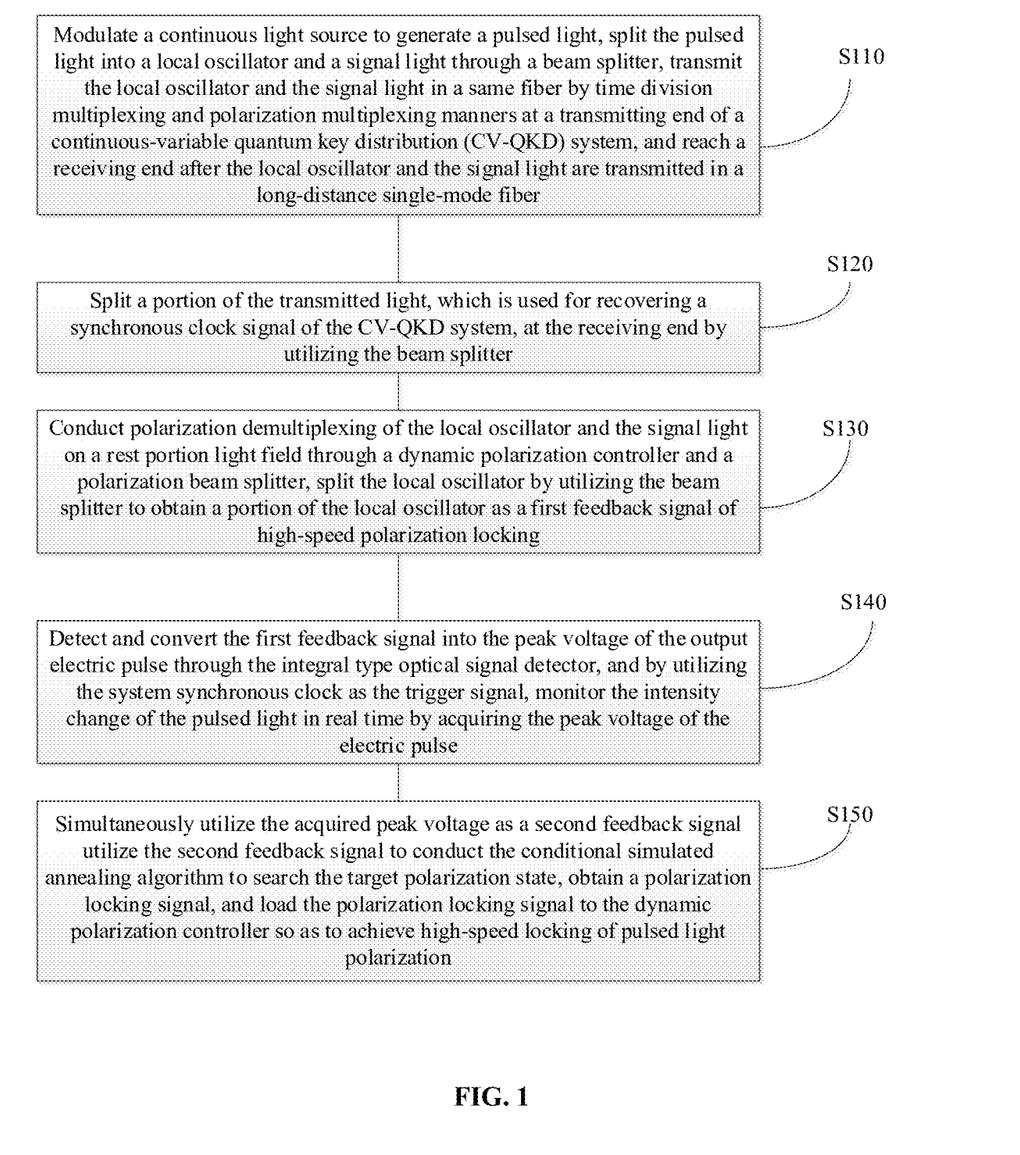
FIG. 1 is a flow chart of a pulsed light high-speed polarization locking method of a continuous-variable quantum key distribution (CV-QKD) system provided by the present invention.

Referring to FIG. 1, there is shown a flow chart of a pulsed light high-speed polarization locking method of a continuous-variable quantum key distribution (CV-QKD) system provided by an embodiment of the present invention. The method includes:

S110: modulate a continuous light source to generate a pulsed light. The pulsed light is split into a local oscillator and a signal light through a beam splitter. The local oscillator and the signal light are transmitted in a same fiber by time division multiplexing and polarization multiplexing at a transmitting end of a CV-QKD system. The local oscillator and the signal light are transmitted through a long-range single-mode fiber and reach a receiving end of the same.

In one embodiment of the present invention, the continuous light source is modulated to be a pulsed light with a repetition rate of 500 kHz, a pulse width of 100 ns and an extinction ratio of 80 dB through two cascaded amplitude modulators. The pulsed light is split into an intense local oscillator and a weak signal light through a 99/1 beam splitter, the signal light undergoes amplitude and phase modulation to achieve a Gaussian-modulated coherent state protocol, and the local oscillator and the signal light are transmitted in the same long-distance single-mode fiber by utilizing time-division multiplexing and polarization multiplexing technologies and then reach the receiving end.

S120: a portion of the transmitted light is split, which is used for recovering a synchronous clock signal of the CV-QKD system, at the receiving end by utilizing the beam splitter.

S130: conduct polarization demultiplexing of the local oscillator and the signal light on the rest(remaining) portion light field through a dynamic polarization controller and a polarization beam splitter. The local oscillator is split by utilizing the beam splitter to obtain a portion of the local oscillator as a first feedback signal of high-speed polarization locking.

A phase modulator is utilized in the local oscillator to randomly convert a measurement base and is also used for locking relative phases between the signal light and the local oscillator. Finally, a balanced homodyne detector is used for measuring a quadrature amplitude component or a quadrature phase component of the signal light.

A portion of lights are split from the transmitted light emitting from the long-distance single-mode fiber through a beam splitter. A synchronous clock signal capable of being accurately delayed is obtained by utilizing a clock recovery module. The signal light and the local oscillator are separated by the dynamic polarization controller and the polarization beam splitter, and a portion of the local oscillator is split by the beam splitter and is utilized as the feedback signal of the high-speed polarization locking. The single pulsed light is converted into a peak voltage of an output electric pulse by an integral type optical signal detection module based on a charge amplifier. By utilizing a system synchronous clock as a trigger signal, an FPGA controls a high-speed A/D to acquire the peak voltage of the output electric pulse of the integral type optical signal detection module and utilize the peak voltage as an algorithm feedback signal. The FPGA hardware is utilized to achieve a conditional simulated annealing algorithm to search a target polarization state, and an output control signal drives the dynamic polarization controller through a digital port, so as to complete the high-speed light field polarization locking under the pulsed light.

S140: detect and convert the first feedback signal into the peak voltage of the output electric pulse through the integral type optical signal detector. By utilizing the system synchronous clock as the trigger signal, monitor the intensity change of the pulsed light in real time by acquiring the peak voltage of the electric pulse.

S150: simultaneously utilize the acquired peak voltage as a second feedback signal to conduct the conditional simulated annealing algorithm to search the target polarization state, obtain a polarization locking signal, and load the polarization locking signal to the dynamic polarization controller so as to achieve high-speed locking of pulsed light polarization.

In a polarization control unit, the utilized dynamic polarization controller is formed by four squeezer. The included angles between the four squeezers and an x-axis direction sequentially are 0 degree, 45 degrees, 0 degree and 45 degrees. A range of voltage inputted into each channel of the dynamic polarization controller is 0-5 V, and 20 paths of digital output ports of the FPGA hardware drive the dynamic polarization controller.

In the dynamic polarization controller unit, the FPGA is used to achieve the conditional simulated annealing algorithm to search the target polarization state, and a polarization extinction ratio greater than 25 dB is utilized as a judgment threshold for stopping the polarization control algorithm, where the according to one embodiment, the specific implementation is as follows:

Step (1): set an inner cycle number and an outer cycle number in a simulated annealing algorithm to be l and k, and an initial temperature to be $T_0$;

Step (2): set an inner cycle initial value i=1 and an outer cycle initial value n=1;

Step (3): define a temperature updating function to be an exponential decreasing function: $T_{k+1}=p \cdot T_k$ (0<p<1); Step (4): load a group of constant initial voltage values ($V_1$, $V_2$, $V_3$, $V_4$) to the dynamic polarization controller having four squeezers, and acquire a pulse peak $V_i$ of the local oscillator as a feedback signal; conduct a step voltage function on the initial voltage values to obtain a group of new voltage values ($V_1'$, $V_2'$, $V_3'$, $V_4'$), acquire a feedback signal $V_t$, and meanwhile, calculate a current polarization extinction ratio; compare increment of the acquired feedback signals, $\Delta=V_t-V_i$; if $\Delta<0$, accept the group of the new voltage values ($V_1'$, $V_2'$, $V_3'$, $V_4'$) as a current solution, and if $\Delta>0$, calculate a probability $$P = \exp\left(-\frac{V_t - V_i}{T_i}\right),$$

where $T_i$ is a current annealing temperature, and a is a random number from 0 to 1; and if P≥a, accept the group of the new voltage values as the current solution; otherwise, continuing to utilize the original group of the voltage values as the current solution to conduct the next iteration;

Step (5): update the inner cycle number i=i+1; if i<l, return to conduct the step (4); and if i>l, update the outer cycle number n=n+1, and meanwhile, update the current annealing temperature $T_{k+1}=p \cdot T_k$;

Step (6): monitor the current polarization extinction ratio in real time. If a preset polarization extinction ratio threshold is met, stop operating the algorithm and complete the polarization locking, where the current solution is the optimal solution. If the preset polarization extinction ratio threshold is not met, return the step (4); and Step (7): when n>k, complete the cyclic iteration, and at this time, output the current solution as the optimal solution.

Figure 2:
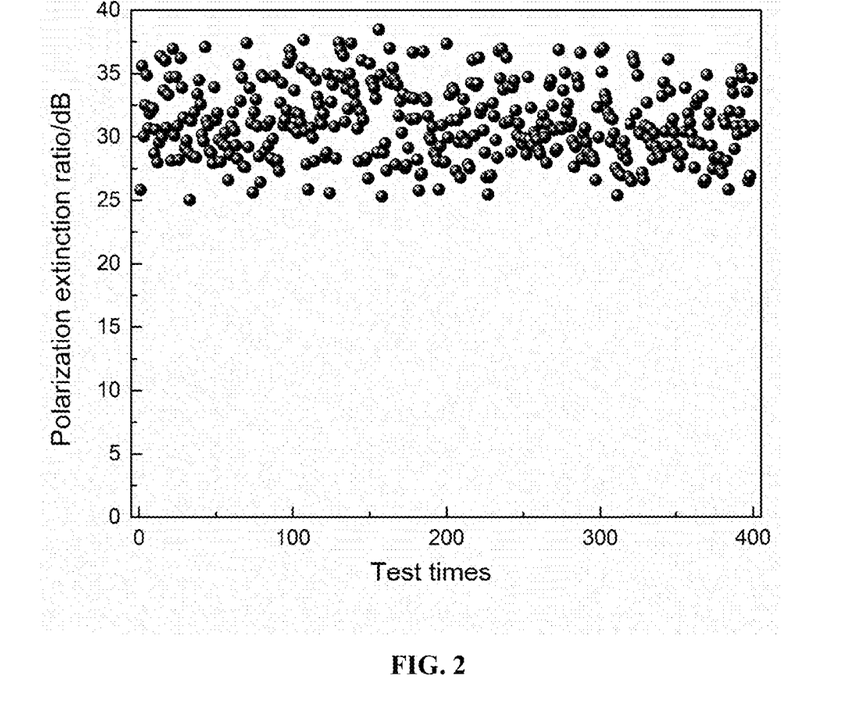
FIG. 2 shows a graphical representation of high-speed polarization locking results in a pulsed light high-speed polarization locking method of a CV-QKD system provided by the present invention.
Figure 3:
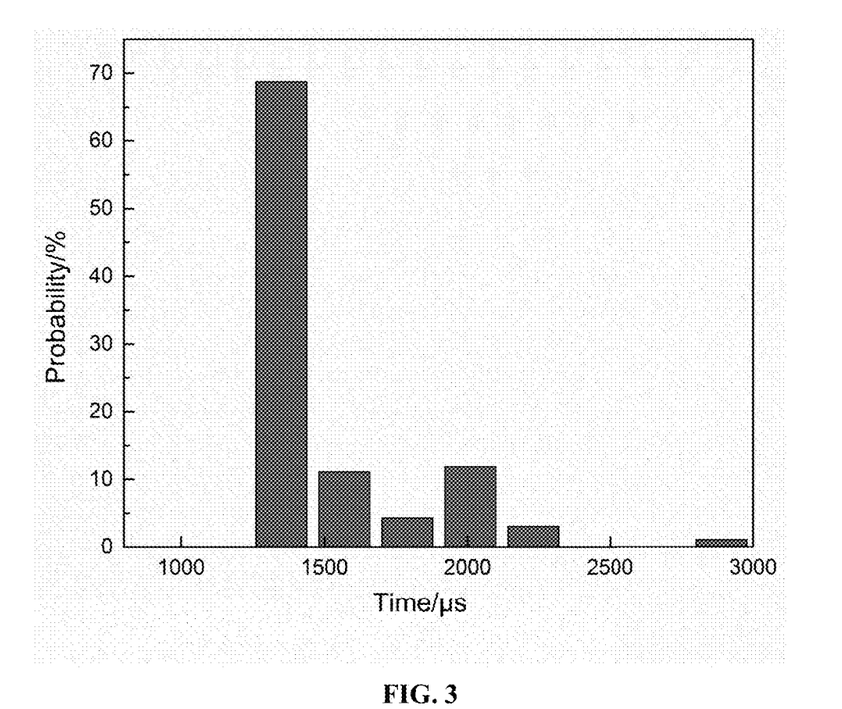
FIG. 3 is a graphical distribution diagram of time probability consumed by polarization-locking in a pulsed light high-speed polarization locking method of a CV-QKD system provided by the present invention.
Figure 4:
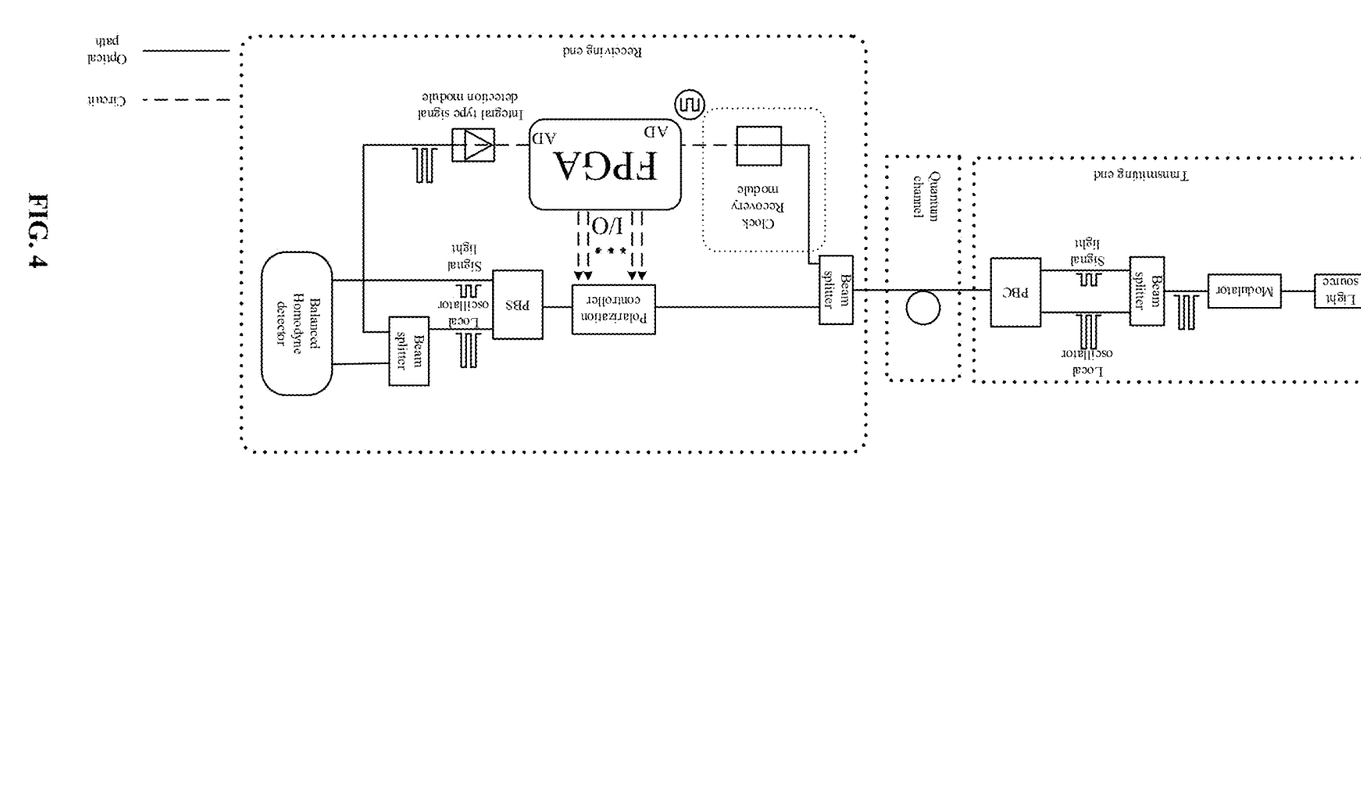
FIG. 4 is a schematic diagram of a high-speed polarization locking experimental apparatus in a pulsed light high-speed polarization locking method of a CV-QKD system provided by the present invention.
Figure 5:
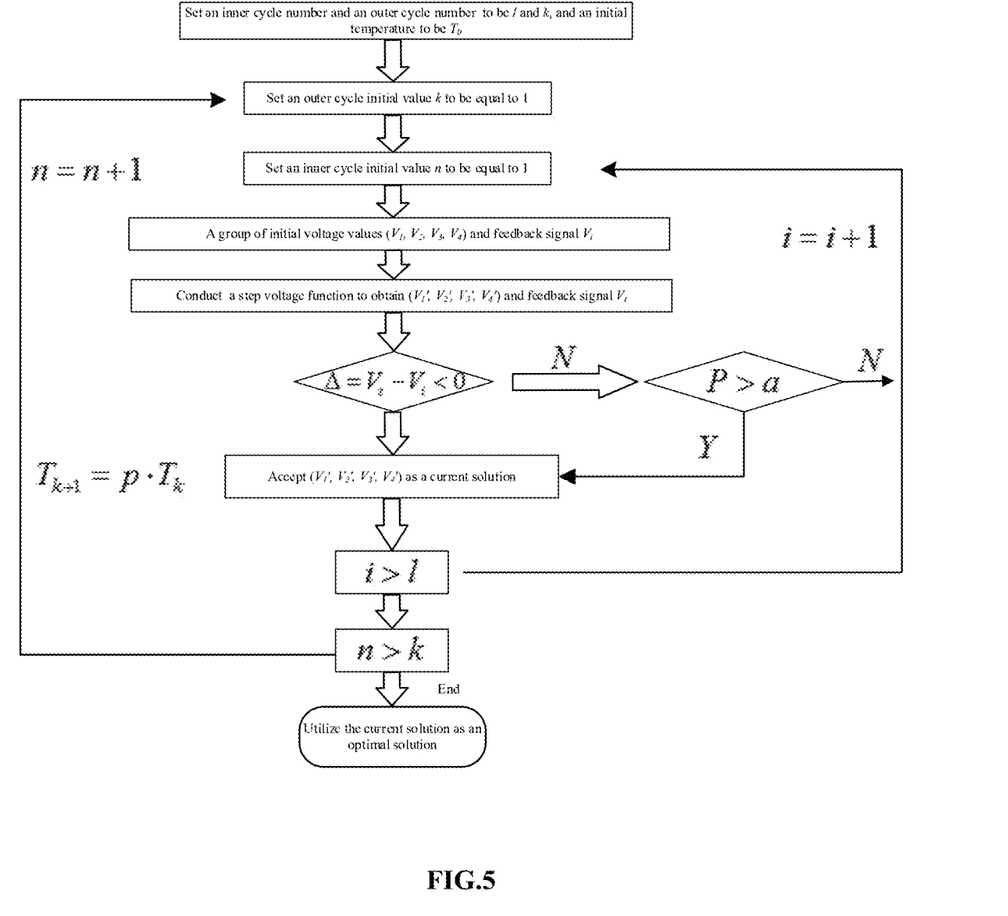
FIG. 5 is a schematic diagram showing logic of a conditional simulated annealing algorithm in a pulsed light high-speed polarization locking method of a CV-QKD system provided by the present invention.

FIG. 2 shows high-speed polarization locking results, and after the high-speed polarization locking is completed, the probability of the polarization extinction ratio greater than 25 dB is 99.5%. FIG. 3 shows polarization-locking-consumed time probability distribution, and an average of a polarization locking cycle is 1544 microseconds. FIG. 4 is a schematic diagram of a high-speed polarization locking experimental apparatus. FIG. 5 is a principle diagram of a conditional simulated annealing algorithm.

The pulsed light high-speed polarization locking method of a CV-QKD system provided by the present invention can lock a polarization state of light at a high speed, and effectively overcomes influence of the birefringent effect on the polarization state of light, caused by outside environment temperature, vibration and the like, of the long-distance single-mode fiber. In addition, power change of the pulsed local oscillator can be accurately monitored in real time to strengthen the resistance of the system against the local oscillator dithering attack. The invention can improve security and stability of the CV-QKD system under the complex external environments and provides technical guarantees for practical development of the CV-QKD system.

Different from the prior art, the present invention provides the pulsed light high-speed polarization locking method of a CV-QKD system. The integral type optical signal detector based on the charge amplifier is used for converting energy of a single pulsed light into the peak voltage of the output electric pulse in real time without the need of conducting high-speed data sampling and subsequent integration, effectively simplifying the data acquisition and processing. By utilizing the characteristics of high data processing speed and good real-time performance of the FPGA hardware, the conditional simulated annealing algorithm is quickly operated to search the target polarization state and achieve the high-speed polarization locking of the pulsed light. In addition, the power change of the local oscillator is monitored in real time to strengthen the resistance of the system against the local oscillator dithering attack. The present invention can effectively solve the problem of rapid polarization state fluctuations of the pulsed light caused by the complex external environment.

The foregoing is merely a favorable embodiment of this application and does not constitute a limitation on the scope of the present invention. Any equivalent structure or equivalent process change made by using the description and the accompanying drawings of the present invention, or direct or indirect application thereof in other related technical fields, shall still fall in the protection scope of the patent of the present invention.

What is claimed is:

1. A pulsed light high-speed polarization locking method of a continuous-variable quantum key distribution (CV-QKD) system, the method comprising:
   modulating a continuous light source to generate a pulsed light;
   splitting the pulsed light into a local oscillator and a signal light through a transmitter beam splitter;
   transmitting the local oscillator and the signal light in a same fiber by time division multiplexing and polarization multiplexing at a transmitting end of a CV-QKD system, and
   transmitting the local oscillator and the signal light through a long-distance single-mode fiber to reach a receiving end;
   recovering a synchronous clock signal of the CV-QKD system at the receiving end by splitting a portion of the transmitted light utilizing a receiver beam splitter;
   conducting polarization demultiplexing of the local oscillator and the signal light on a remaining portion of the light through a dynamic polarization controller and a polarization beam splitter, and splitting the local oscillator by utilizing the receiver beam splitter to obtain a portion of the local oscillator as a first feedback signal of high-speed polarization locking;
   detecting and converting the first feedback signal into a peak voltage of an output electric pulse through an optical signal detector, and by utilizing a system synchronous clock as a trigger signal, monitoring intensity changes of pulsed light in real time by acquiring the peak voltage of the output electric pulse; and
   simultaneously utilizing the acquired peak voltage as a second feedback signal to conduct a conditional simulated annealing algorithm to search a target polarization state, to obtain a polarization locking signal, and load the polarization locking signal to the dynamic polarization controller so as to achieve high-speed polarization locking of pulsed light.

2. The pulsed light high-speed polarization locking method of a CV-QKD system according to claim 1, wherein the utilizing of the second feedback signal to conduct the conditional simulated annealing algorithm comprises:
   setting an inner cycle number and an outer cycle number in the conditional simulated annealing algorithm to be l and k, and an initial temperature to be $T_0$;
   setting an inner cycle initial value i=1 and an outer cycle initial value n=1;
   defining a temperature updating function to be an exponential decreasing function: $T_{k+1}=p \cdot T_k$ (0<p<1);
   loading initial voltage values ($V_1$, $V_2$, $V_3$, $V_4$) to squeezers of the dynamic polarization controller;
   acquiring a pulse peak $V_i$ of the local oscillator as the second feedback signal;
   conducting a step voltage function to obtain a group of new voltage values ($V'_1$, $V'_2$, $V'_3$, $V'_4$) and a third feedback signal $V_t$, and meanwhile, calculating a current polarization extinction ratio;
   comparing increment of the second feedback signal after calculating, $\Delta=V_t-V_i$ and if $\Delta<0$, accepting the group of the new voltage values ($V'_1$, $V'_2$, $V'_3$, $V'_4$) as a current solution, and if $\Delta>0$, calculating a probability $$P = \exp\left(-\frac{V_t - V_i}{T_i}\right),$$

wherein $T_i$ is a current annealing temperature, and setting a to be a random number from 0 to 1; if P≥a, accepting the group of the new voltage values as the current solution, otherwise, continuing to utilize the group of the initial voltage values as the current solution to conduct the next iteration;
   updating the inner cycle number i=i+1, and if i<l, reiterating the conducting step, calculating a current polarization extinction ratio and a following comparing increment, accepting the group of voltage values and calculating a probability, and if i>l, updating the outer cycle number n=n+1, and meanwhile, updating the current annealing temperature $T_{k+1}=p \cdot T_k$; and
   monitoring the current polarization extinction ratio in real time, and if a preset polarization extinction ratio threshold is met, stopping operating the algorithm and completing the polarization locking, wherein the current solution is the optimal solution, and if the preset polarization extinction ratio threshold is not met, and when n>k, completing a cyclic iteration, and outputting the current solution as the optimal solution.

3. The pulsed light high-speed polarization locking method of a CV-QKD system according to claim 1, wherein in the modulating of the continuous light source to generate a pulsed light and splitting the pulsed light into a local oscillator and a signal light through a beam splitter, further comprises modulating the continuous light source to be a pulsed light with a repetition rate of 500 kHz, a pulse width of 100 ns and an extinction ratio of 80 dB through two cascaded amplitude modulators, and splitting the pulsed light into a local oscillator and a signal light through a 99/1 beam splitter.

4. The pulsed light high-speed polarization locking method of a CV-QKD system according to claim 2, wherein the preset polarization extinction ratio threshold is 25 dB.

5. The pulsed light high-speed polarization locking method of a CV-QKD system according to claim 1, wherein an the optical signal detection module converts energy of a single pulsed light into the peak voltage of the output electric pulse based on the principle of a charge amplifier.

6. The pulsed light high-speed polarization locking method of a CV-QKD system according to claim 1, wherein the recovered synchronous clock signal of the CV-QKD system is obtained as a clock signal having time delay and is used for triggering FPGA hardware to control a high-speed A/D to accurately acquire the peak voltage, the peak voltage is utilized as a feedback signal of a polarization locking algorithm, and is also used for monitoring instantaneous change of the pulsed light intensity to strengthen a resistance against a local oscillator dithering attack.

7. The pulsed light high-speed polarization locking method of a CV-QKD system according to claim 1, wherein the conditional stimulated annealing algorithm utilizes sectional step-length step voltage functions, at an initial stage of polarization control, the feedback signal is not an optimal solution, and a large-step-length step voltage function is utilized;

wherein when the feedback signal reaches a certain value, a small-step-length step voltage function is utilized, and the value of the step length is set according to the size of the real-time polarization extinction ratio to achieve an optimal locking effect.

\* \* \* \* \*